US008342152B2

(12) United States Patent
Usukura et al.

(10) Patent No.: US 8,342,152 B2

(45) Date of Patent: Jan. 1, 2013

(54) FLOW CONTROLLING METHOD FOR AN AUXILIARY INTAKE FLOW PASSAGE

(75) Inventors: Yasutaka Usukura, Saitama (JP); Hiroshi Noda, Saitama (JP); Kenichi Machida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1010 days.

(21) Appl. No.: 12/361,058

(22) Filed: Jan. 28, 2009

(65) Prior Publication Data

US 2009/0194068 A1 Aug. 6, 2009

(30) Foreign Application Priority Data

Jan. 31, 2008 (JP) ................................ 2008-022024

(51) Int. Cl.
*F02D 9/08* (2006.01)
*F02D 9/10* (2006.01)

(52) U.S. Cl. ........................ 123/403; 123/395; 123/399

(58) Field of Classification Search .................. 123/403, 123/179.16, 179.18, 585, 586, 588, 395, 123/399; 701/113
See application file for complete search history.

(56) References Cited

U.S. PATENT DOCUMENTS

| | | | | |
|---|---|---|---|---|
| 4,020,935 A * | 5/1977 | Mortensen | ................ | 192/104 R |
| 4,344,398 A * | 8/1982 | Ikeura | ...................... | 123/339.22 |
| 4,375,208 A * | 3/1983 | Furuhashi et al. | ....... | 123/339.17 |
| 4,545,348 A * | 10/1985 | Ikeura | .......................... | 477/111 |
| 4,545,349 A * | 10/1985 | Ito et al. | ................... | 123/339.11 |
| 5,720,258 A * | 2/1998 | Tolkacz et al. | ................ | 123/352 |

FOREIGN PATENT DOCUMENTS

| | | |
|---|---|---|
| JP | 62-195430 A | 8/1987 |
| JP | 2005-105938 A | 4/2005 |
| JP | 2006-200727 A | 8/2006 |

* cited by examiner

*Primary Examiner* — Mahmoud Gimie
(74) *Attorney, Agent, or Firm* — Birch, Stewart, Kolasch & Birch, LLP

(57) ABSTRACT

A flow controlling method for an auxiliary intake flow passage for use in a power unit which includes a starter clutch which is automatically engaged and disengaged in response to the engine speed. An intake air control valve (IACV) carries out changeover from water temperature dependent control (open loop control of adjusting the flow rate of the auxiliary intake flow passage in response to the warming up state of an engine) to target engine speed feedback control when the actual engine speed NE [rpm] drops to a clutch disengagement engine speed NEout (engine speed at which the centrifugal clutch is disengaged) (S3: Yes) and the opening θ1 [degree] of the throttle valve becomes smaller than a predetermined threshold value (throttle valve opening threshold value TH_θ1 (S4: Yes).

17 Claims, 12 Drawing Sheets

| | | MODE CHANGEOVER MECHANISM | |
|---|---|---|---|
| | | N MODE | D MODE |
| TW [°C] | LOW | 2200 | 1350 |
| | | 1500 | 1500 |
| | HIGH | 1600 | 1350 |
| | | 1200 | 1200 |

98

UPPER STAGE: NEsw [rpm]

LOWER STATE: T_NE [rpm]

FIG.6

FLOW CONTROLLING METHOD FOR AN AUXILIARY INTAKE FLOW PASSAGE

CROSS-REFERENCE TO RELATED APPLICATIONS

The present application claims priority under 35 USC 119 to Japanese Patent Application No. 2008-022024 filed on Jan. 31, 2008 the entire contents of which are hereby incorporated by reference.

BACKGROUND OF THE INVENTION

1. Field of the Invention

This invention relates to a flow controlling method for an auxiliary intake flow passage for controlling the flow rate of air to flow through an auxiliary intake flow passage in a power unit wherein a main intake flow passage and the auxiliary intake flow passage are communicated with an engine and a starter clutch such as a centrifugal clutch is disposed between the engine and a transmission.

2. Description of Background Art

A configuration which includes, in addition to a main intake flow passage on which a throttle valve is disposed, an auxiliary intake flow passage on which an intake air control valve (IACV) is disposed is known. See, for example, Japanese Patent Laid-Open No. 2005-105938 and Japanese Patent Laid-Open No. Sho 62-195430. With such a configuration as just described, even in a state wherein a throttle valve whose opening varies in response to an acceleration/deceleration operation of a driver is closed to a predetermined opening, since an ECU (electrical control unit) controls the opening of the IACV, stabilization of the engine speed upon idling and enhancement of the engine start ability in a low temperature state are achieved.

In Japanese Patent Laid-Open No. 2005-105938, when the engine is in an idling state, feedback control for controlling an IACV so that the actual engine speed may coincide with a target engine speed is used, but when the engine is in a non-idling state, open loop control of controlling the IACV based on the temperature of engine cooling water is used. See, the abstract of Japanese Patent Laid-Open No. 2005-105938. A decision between the idling state and the non-idling state is carried out based on whether the throttle opening is lower than an opening at which the throttle is open a little from the opening in a fully closed state and whether or not the engine speed is lower than a speed of rotation which is a tittle higher than the idling speed. See, paragraph [0015] of Japanese Patent Laid-Open No. 2005-105938.

In addition, a starter clutch (for example, a centrifugal clutch) which is engaged and disengaged automatically in response to the engine speed in order to implement smooth starting and stopping and so forth is known. See, FIG. 9 of Japanese Patent Laid-Open No. 2006-200727.

While an IACV is disclosed in Japanese Patent Laid-Open No. 2005-105938 and Japanese Patent Laid-Open No. Sho 62-195430 and a starter clutch is disclosed in Japanese Patent Laid-Open No. 2006-200727, a method of causing an IACV to operate suitably in a power unit which includes an IACV and a starter clutch (method of suitably controlling the flow rate of air to flow through an auxiliary intake flow passage) has not been investigated.

SUMMARY AND OBJECTS OF THE INVENTION

The present invention has been made taking the subject described above into consideration. It is an object of an embodiment of the present invention to provide a flow controlling method for an auxiliary intake flow passage which can be used suitably in a power unit which includes a starter clutch which is automatically engaged and disengaged in response to the engine speed.

A flow controlling method for an auxiliary intake flow passage according to an embodiment of the present invention has the following characteristics.

A flow controlling method is provided for an auxiliary intake flow passage for controlling the flow rate of air flowing through an auxiliary intake flow passage in a power unit which includes an engine which communicates with a main intake flow passage on which a throttle valve is provided and the auxiliary intake flow passage on which an intake air control valve (IACV) is provided. A starter clutch, for being automatically placed into engagement/disengagement in response to an engine speed, and a transmission connected to the starter clutch, is configured such that, as a control of the IACV, open loop control of controlling the opening of the IACV in response to a warming up state of the engine and feedback control of controlling the opening of the IACV in response to the difference between an actual engine speed and a target engine speed are used such that, when the actual engine speed drops to a clutch disengagement engine speed indicative of an engine speed at which the starter clutch is disengaged, the control of the IACV is changed over from the open loop control to the feedback control.

According to an embodiment of the present invention, when the actual engine speed drops to the clutch disengagement engine speed, the control can be changed over from the open loop control of controlling the flow rate of the auxiliary intake flow passage in response to the warming up state of the engine to the feedback control for controlling the flow rate in response to the difference between the actual engine speed and the target engine speed. In the starter clutch which is automatically engaged and disengaged in response to the engine speed, the engine speed at which the starter clutch is disengaged exhibits a value higher than that of the engine speed at which the starter clutch is engaged. Therefore, even if the actual engine speed becomes a little higher than the clutch disengagement engine speed immediately after it drops to the clutch disengagement engine speed, since the starter clutch remains disengaged, while the load applied to the engine when the starter clutch is in an engaged state is eliminated, the feedback control which exhibits its effect upon idling can be used efficiently.

It is to be noted that "when the actual engine speed drops to a clutch disengagement engine speed" can be decided not only depending upon whether the actual engine speed is brought into coincidence with the clutch disengagement engine speed but also depending upon whether or not the actual engine speed is brought into coincidence with a value obtained by adding a margin (negative value) determined taking a decision error and so forth into consideration to the clutch disengagement engine speed.

The flow controlling method for the auxiliary intake flow passage is configured such that a drive mode in which torque from the engine is transmitted to a driving wheel and a neutral mode in which the torque is not transmitted to the driving wheel are provided for selection such that, when the drive mode is selected, a control changeover engine speed which is an engine speed at which the control of the IACV is to be changed over from the open loop control to the feedback control is set lower than the clutch disengagement engine speed or a value obtained by adding a predetermined margin which assumes a negative value to the clutch disengagement engine speed, but when the neutral mode is selected, the control changeover engine speed is set to a value higher than the clutch changeover engine speed.

When the drive mode is selected, the possibility that the vehicle may be re-accelerated exists to some degree. On the other hand, when the neutral mode is selected, the possibility of such re-acceleration is very low. Therefore, for example, when the warming up of the engine is not sufficient, changeover from the open loop control to the feedback control can be carried out comparatively rapidly in the neutral mode.

The flow controlling method for the auxiliary intake flow passage is configured such that, after the feedback control is started, before the actual engine speed first reaches the target engine speed, a first feedback coefficient is used, but after the actual engine speed first reaches the target engine speed, a second feedback coefficient lower than the first feedback coefficient is used.

According to an embodiment of the present invention, after the actual engine speed drops to the clutch disengagement engine speed and the feedback control is stated, before the actual engine speed reaches the target engine speed first, the first feedback coefficient higher than the second feedback coefficient is used. Therefore, it becomes liable to prevent the actual engine speed from dropping from the clutch disengagement engine speed to the stall engine speed, and it is possible to cause the engine stall to occur less likely.

The flow controlling method for the auxiliary intake flow passage is configured such that the control changeover engine speed in the neutral mode is varied in response to an internal temperature of the engine. By this, the control can be changed over mechanically from the open loop control to the feedback control in response to the warming up state of the engine. For example, immediately after the engine is started when quick warming up is demanded, by setting the control changeover engine speed to a high value, the control advances to the feedback control rapidly, and warming up can be carried out rapidly.

The flow controlling method for the auxiliary intake flow passage is configured such that, when the drive mode is selected, in the feedback control, the target engine speed is set to a value which is higher than the clutch disengagement engine speed but is lower than a clutch engagement engine speed indicative of an engine speed at which the starter clutch is engaged. As described above, in a starter clutch which is automatically engaged and disengaged in response to the engine speed, the engine speed (clutch engagement engine speed) at which the starter clutch is engaged exhibits a value higher than that of the engine speed (clutch disengagement engine speed) at which the starter clutch is disengaged. In other words, a hysteresis exists in engagement and disengagement of the starter clutch. After the starter clutch is disengaged once, it is not brought into engagement until after the actual engine speed reaches the clutch engagement engine speed. By utilizing this fact such that the target engine speed is set to a value equal to or higher than the clutch disengagement engine speed but equal to or lower than the clutch engagement engine speed, warming up of the engine can be carried out rapidly using a target engine speed of a comparatively high value in a state wherein the starter clutch is disengaged.

The flow controlling method for an auxiliary intake flow passage is configured such that, when the throttle opening increases to a predetermined threshold value, the control of the IACV is changed over from the feedback control to the open loop control.

According to an embodiment of the present invention, when the actual engine speed drops to the clutch disengagement engine speed, the control can be changed over from the open loop control of controlling the flow rate of the auxiliary intake flow passage in response to the warming up state of the engine to the feedback control of controlling the flow rate in response to the difference between the actual engine speed and the target engine speed. In the starter clutch which is automatically engaged and disengaged in response to the engine speed, the engine speed at which the starter clutch is disengaged exhibits a value higher than that of the engine speed at which the starter clutch is engaged. Therefore, even if the actual engine speed becomes a little higher than the clutch disengagement engine speed immediately after it drops to the clutch disengagement engine speed, since the starter clutch remains disengaged, while the load applied to the engine when the starter clutch is in an engaged state is eliminated, the feedback control which exhibits its effect upon idling can be used efficiently.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is a view illustrating a selection method of a control changeover engine speed at which changeover from the water temperature dependent control to the target engine speed feedback control is carried out in the embodiment described above;

DETAILED DESCRIPTION OF THE PREFERRED EMBODIMENTS

In the following, an embodiment of the present invention is described with reference to the drawings.

Figure 1:
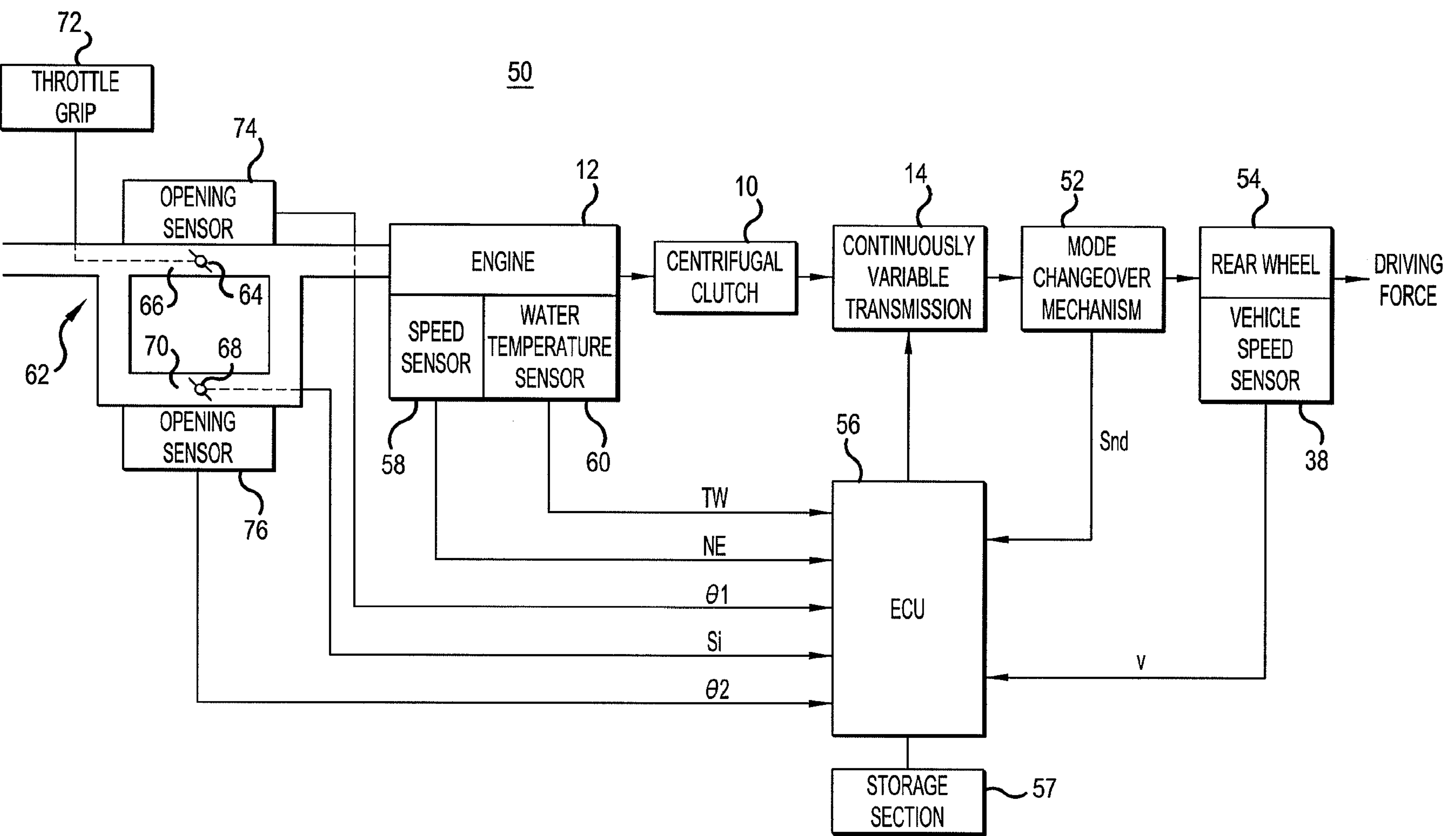
FIG. 1 is a block diagram of a power unit according to an embodiment of the present invention.

In FIG. 1, a schematic block diagram of a power unit 50 which can execute a flow controlling method for an auxiliary intake flow passage according to an embodiment of the present invention is shown. This power unit 50 can be incorporated in a vehicle such as a motorcycle.

In the power unit 50, torque generated by an engine 12 is transmitted to a rear wheel (driving wheel) 54 through a centrifugal clutch 10, a continuously variable transmission 14 and a mode changeover mechanism 52. Operation of the engine 12, centrifugal clutch 10, continuously variable transmission 14, mode changeover mechanism 52 and rear wheel 54 is controlled by an ECU (electrical control unit) 56. A storage section 57 is connected to the ECU 56.

The engine 12 includes an engine speed sensor 58 and a water temperature sensor 60, and an engine speed NE [rpm] detected by the engine speed sensor 58 and a water temperature TW [° C.] of engine cooling water detected by the water temperature sensor 60 are conveyed to the ECU 56.

An intake pipe 62 connected to the engine 12 includes a main intake flow passage 66 on which a throttle valve 64 is provided and a bypass flow passage 70 (auxiliary intake flow passage) on which an intake air control valve 68 (hereinafter referred to also as "IACV 68") is provided. The opening θ1 [degree] of the throttle valve 64 is controlled basically based on the operation amount of a throttle grip 72 by the driver. Meanwhile, the opening θ2 [degree] of the IACV 68 is controlled by a control signal Si from the ECU 56. The control of the openings θ1 and θ2 may be carried out by a so-called computer and wire. The opening θ1 of the throttle valve 64 is detected by a throttle valve opening sensor 74. The opening θ2 of the IACV 68 is detected by an IACV opening sensor 76. The openings θ1 and θ2 are conveyed to the ECU 56.

Figure 2:
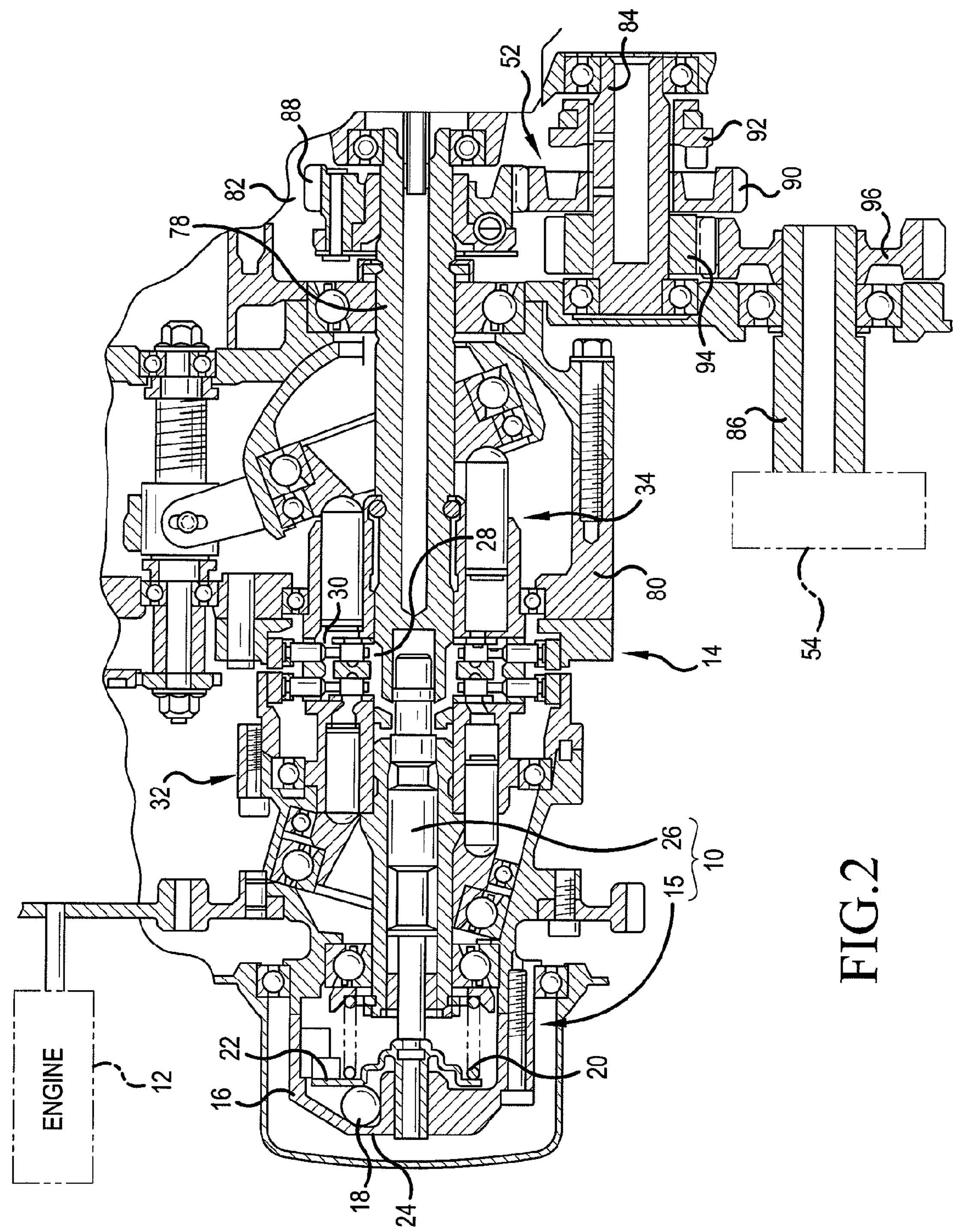
FIG. 2 is a sectional view partly omitted of the power unit of FIG. 1.
Figure 3:
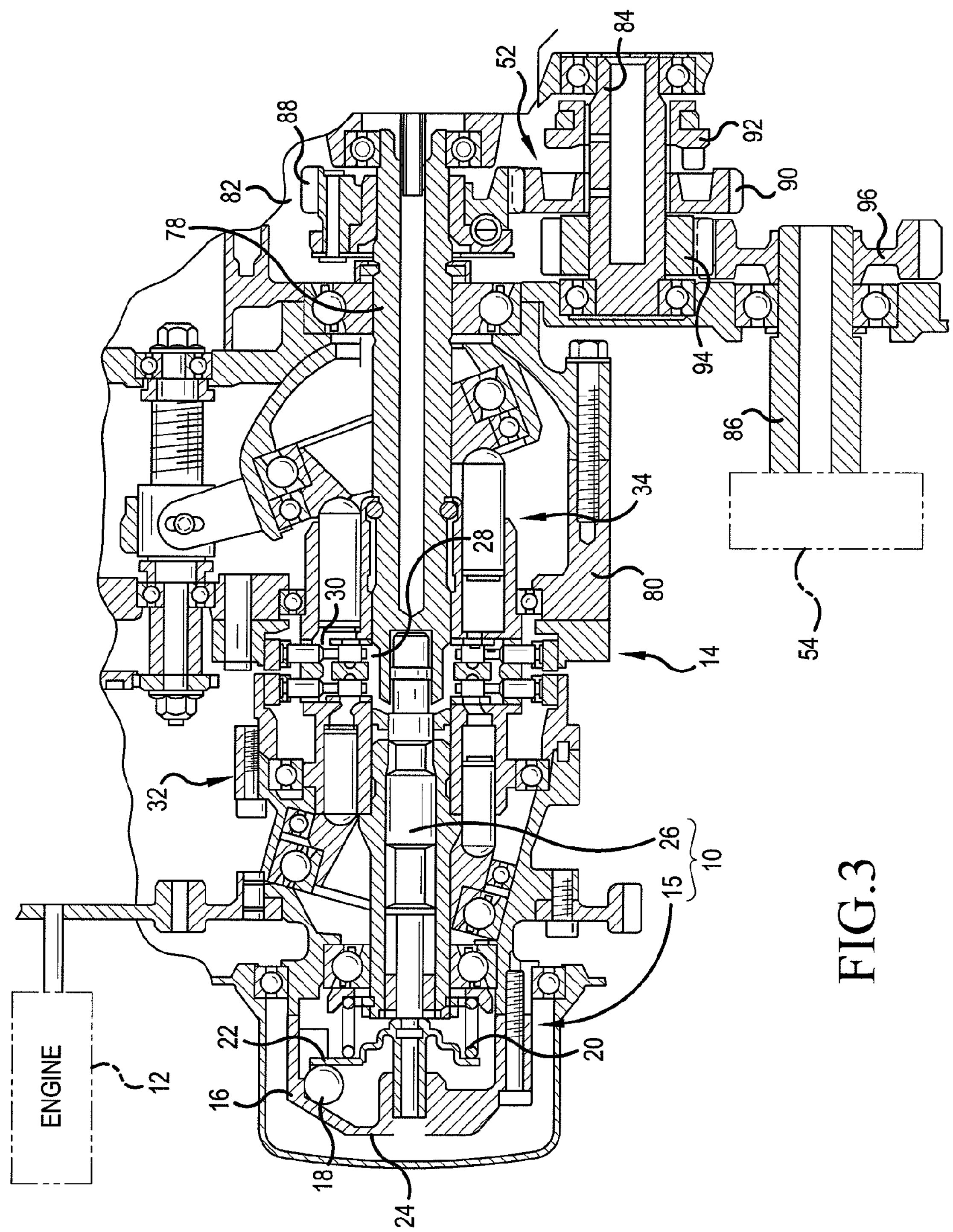
FIG. 3 is a sectional view partly omitted illustrating a state wherein a centrifugal clutch is disengaged in the power unit of FIG. 1.

In FIGS. 2 and 3, sectional views of the power unit 50 partly omitted are shown. FIG. 2 illustrates a state wherein the centrifugal clutch 10 is disengaged and FIG. 3 illustrates another state wherein the centrifugal clutch 10 is engaged.

The centrifugal clutch 10 is automatically engaged and disengaged using centrifugal force generated therein in response to the speed [rpm] of the engine 12 to transmit torque from the engine 12 to the continuously variable transmission 14. This continuously variable transmission 14 is a so-called hydraulic continuously variable transmission.

As shown in FIGS. 2 and 3, in the centrifugal clutch 10, a centrifugal weight 18 is disposed for movement in the inside of a rotatable housing 16 of a bottomed substantially cylindrical shape of a centrifugal governor 15. The centrifugal weight 18 is pushed by an operating plate 22 supported by a compression spring 20 and is held in contact, when it is in a normal state (when the centrifugal clutch 10 is not operative), with a bottom face 24 (left side face in FIG. 2) of the rotatable housing 16. Further, the operating plate 22 is connected to a clutch valve 26, and when the centrifugal weight 18 remains in contact with the bottom face 24 of the rotatable housing 16, the clutch valve 26 short-circuits a low pressure oil passage 28 and a high pressure oil passage 30 of the continuously variable transmission 14. Therefore, transmission of torque from a hydraulic pump 32 to a hydraulic motor 34 is not carried out. In other words, the state wherein the clutch is disengaged is implemented.

On the other hand, if the rotatable housing 16 is rotated around the clutch valve 26, then also the centrifugal weight 18 rotates around the clutch valve 26, and centrifugal force which tends to urge the centrifugal weight 18 away from the clutch valve 26 acts upon the centrifugal weight 18. Here, the bottom face 24 of the rotatable housing 16 is inclined to the operating plate 22 side as the distance from the clutch valve 26 increases. Therefore, the centrifugal weight 11 is spaced away from the clutch valve 26 by the centrifugal force, and the operating plate 22 and the clutch valve 26 are biased in a direction (rightward direction in FIG. 2) opposite to the biasing direction of the compression spring 20. Then, as shown in FIG. 3, the short-circuiting of the low pressure oil passage 28 and the high pressure oil passage 30 of the continuously variable transmission 14 is canceled by the movement of the clutch valve 26. Consequently, transmission of torque from the hydraulic pump 32 to the hydraulic motor 34 is permitted, and a state wherein the clutch is engaged is implemented.

The mode changeover mechanism 52 transmits torque transmitted thereto from an output power shaft 78 (FIG. 2) of the continuously variable transmission 14 to the rear wheel 54 and can change over between a drive mode D in which torque is transmitted to the rear wheel 54 and a neutral mode N in which torque is not transmitted to the rear wheel 54. Further, which one of the drive mode D and the neutral mode N is selected is conveyed from the mode changeover mechanism 52 to the ECU 56 using an ND signal Snd. The mode changeover mechanism 52 is disposed in a reduction chamber 82 formed on one side of a rear portion in a mission case 80. The mode changeover mechanism 52 includes an intermediate shaft 84 supported in parallel to the output power shaft 78 of the hydraulic motor 34 for rotation on the mission case 80 with a drive shaft 86 supported in parallel to the intermediate shaft 84 for rotation on the mission case 80. A primary driving gear wheel 88 is spline coupled to an end portion of the output power shaft 78 inserted in the reduction chamber 82 with a primary driven gear wheel 90 supported for rotation on the intermediate shaft 84 and held in meshing engagement with the primary driving gear wheel 88. A dog clutch member 92 is spline fitted for sliding movement on the intermediate shaft 84 adjacent one end of the primary driven gear wheel 90 (in FIG. 2, the dog clutch member 92 is at the neutral mode position N, and if it is moved leftwardly, then the dog clutch member 92 comes to the drive mode position D). A secondary driving gear wheel 94 is coupled to the intermediate shaft 84 adjacent the other side of the primary driven gear wheel 90, and a secondary driven gear wheel 96 is spline coupled to the drive shaft 86 for being driven at a reduced speed from the secondary driving gear wheel 94. The rear wheel 54 is attached to an outer end portion of the drive shaft 86 projecting to the outside of the mission case 80 is attached for rotation together with the drive shaft 86.

The power unit 50 in the present embodiment is configured in such a manner as described above. A flow controlling method for the bypass flow passage 70 in the present embodiment is described below.

Figure 4:
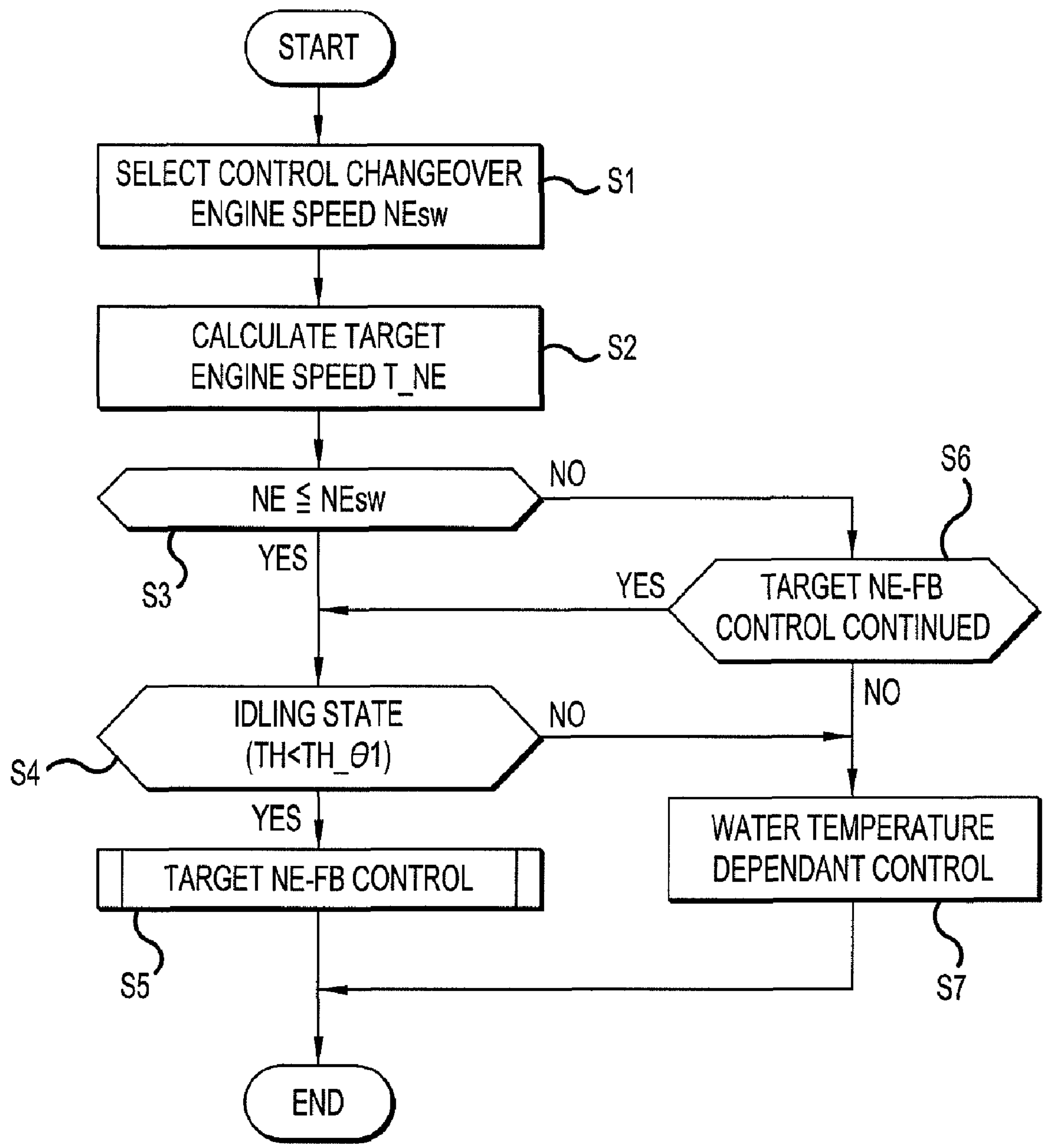
FIG. 4 is a flow chart illustrating changeover between water temperature dependent control and target engine speed feedback control in the embodiment described above.

In FIG. 4, a flow chart for adjusting the opening θ2 of the IACV 68 in order to control the flow rate FRs [g/second] of air flowing through the bypass flow passage 70 is shown. This control is executed by the ECU 56. It is to be noted that the unit of the flow rate FRs may be "L/second."

At step S1, the ECU 56 calculates a control changeover engine speed NEsw [rpm]. The control changeover engine speed NEsw is a threshold value of the engine speed NE at which the control is to be changed over from water temperature dependent control to target engine speed feedback control (hereinafter referred to also as "target NE-FB control"). The water temperature dependent control is a control for varying the opening θ2 of the IACV 68 in response to the water temperature TW detected by the water temperature sensor 60 to adjust the flow rate FRs of air to flow through the bypass flow passage 70 (refer to FIG. 5). Meanwhile, the target NE-FB control is a control for varying the opening θ2 of the IACV 68 in response to the difference between the actual engine speed NE and the target engine speed T_NE to adjust the flow rate FRs of air to flow through the bypass flow passage 70.

At step S2, the ECU 56 calculates the target engine speed T_NE to be used in the target NE-FB control.

The control changeover engine speed NEsw at step S1 and the target engine speed T_NE at step S2 are selected using a table 98 shown in FIG. 6. In particular, the control changeover engine speed NEsw is selected in response to which one of the neutral mode N and the drive mode D is selected by the mode changeover mechanism 52. Further, the neutral mode N is subdivided in response to whether the water temperature TW of cooling water of the engine 12 is high or low. From among the control changeover engine speeds NEsw, the control changeover engine speed NEsw when the water temperature TW is low in the neutral mode N is highest (NEsw=2,200 [rpm]), and the control changeover engine speed NEsw when the water temperature TW is high in the neutral mode N is second highest (NEsw=1,600 [rpm]). When the drive mode D is selected, the control changeover engine speed NEsw is lowest (NEsw=1,350 [rpm]) irrespective of whether the water temperature TW is high or low.

The target engine speed T_NE is set depending upon whether the water temperature TW of the engine cooling water is high or low. In particular, the target engine speed T_NE when the water temperature TW is low is set high, and the target engine speed T_NE when the water temperature TW is high is set low. In the present embodiment, when the water temperature TW is low, the target engine speed T_NE is 1,500 [rpm], but when the water temperature TW is high, the target engine speed T_NE is 1,200 [rpm]. Consequently, when the water temperature TW is low, the engine 12 can be warmed up rapidly, but after the warming up is completed, since the engine speed NE is set low, improvement of the fuel cost and so forth can be anticipated.

It is to be noted that, in the present embodiment, the case wherein the water temperature TW is low signifies that, for example, it is lower than 10° C., but the case wherein the water temperature TW is high signifies that, for example, it is equal to or higher than 10° C. Some other temperature may be set, or the ranges of the water temperature TW can be subdivided such that a greater number of divisions are set. Similarly, not only the drive mode D and the neutral mode N but also some other traveling mode (for example, a sports mode) can be provided such that a greater number of divisions are set.

Figure 7A:
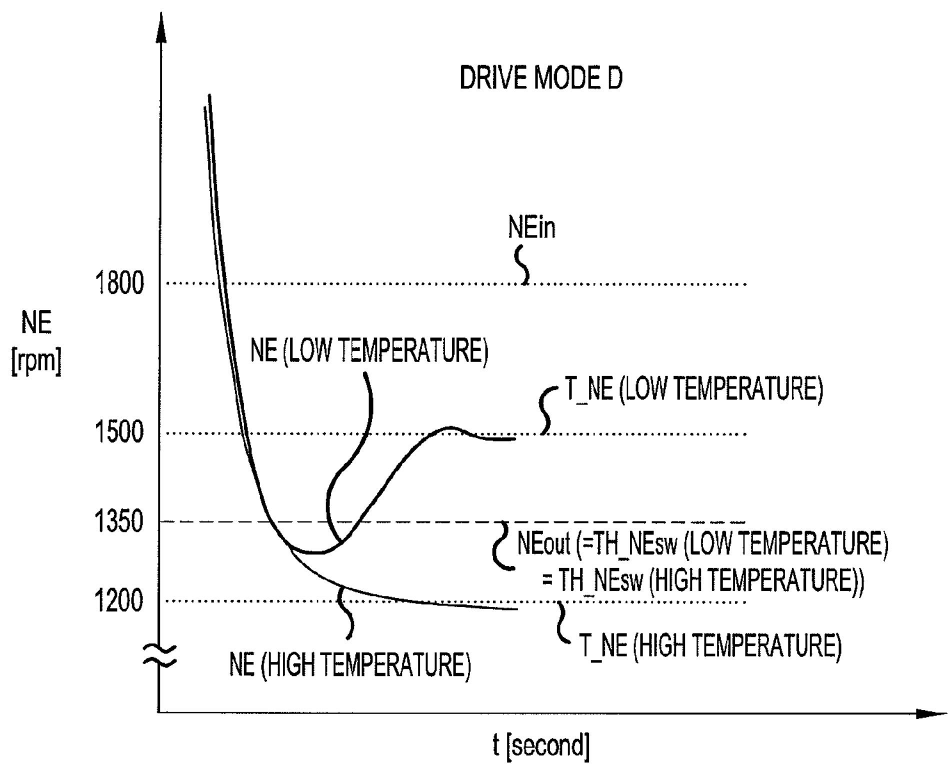
FIG. 7A is a view illustrating an example of control of the engine speed where a drive mode is selected in the embodiment described above.
Figure 7B:
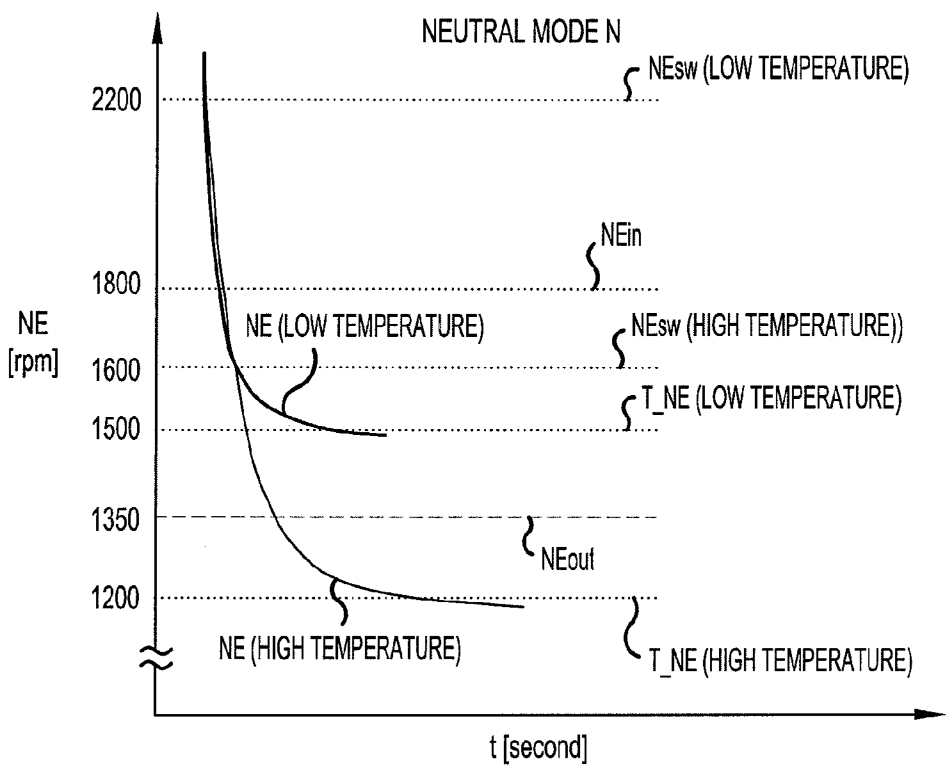
FIG. 7B is a view illustrating an example of control of the engine speed where a neutral mode is selected in the embodiment described above.

It is to be noted that, in a general centrifugal clutch, the engine speed NE (clutch engagement engine speed NEin) at which the centrifugal clutch is engaged is higher than the engine speed NE (clutch disengagement engine speed NEout) at which the centrifugal clutch is disengaged). In other words, upon engagement and disengagement of the centrifugal clutch, a hysteresis exists. Also the centrifugal clutch 10 in the present embodiment has a hysteresis in engagement and disengagement, and the clutch engagement engine speed NEin is 1,800 [rpm] and the clutch disengagement engine speed NEout is 1,350 [rpm] as seen in FIGS. 7A and 7B. Accordingly, of the control changeover engine speed NEsw and the target engine speed T_NE illustrated in FIG. 6, the control changeover engine speed NEsw (=2,200) in the combination of the neutral mode N and the low water temperature has a value higher than both of the clutch engagement engine speed NEin and the clutch disengagement engine speed NEout. The control changeover engine speed NEsw (=1,600) in the combination of the neutral mode N and the high water temperature has a value which is equal to lower than the clutch engagement engine speed NEin but equal to or higher than the clutch disengagement engine speed NEout. Irrespective of whether the water temperature TW is high or low, the control changeover engine speed NEsw (=1,350) has a value equal to or lower than the clutch engagement engine speed NEin but equal to the clutch disengagement engine speed NEout.

Further, in both the neutral mode N and the drive mode D, the target engine speed T_NE (=1,500) at the low water temperature has a value equal to or lower than the clutch engagement engine speed NEin but equal to or higher than the clutch disengagement engine speed NEout. The target engine speed T_NE (=1,200) at the high water temperature has a value equal to or lower than the clutch engagement engine speed NEin and the clutch disengagement engine speed NEout.

Referring back to FIG. 4, at step S3, the ECU 56 confirms whether or not the actual engine speed NE detected by the engine speed sensor 58 is equal to or lower than the control changeover engine speed NEsw selected at step S1. If the actual engine speed NE is equal to or lower than the control changeover engine speed NEsw (S3: Yes), then the processing advances to step S4.

At step S4, the ECU 56 decides whether or not the engine 12 is in an idling state. The decision of whether or not the engine 12 is in an idling state is made depending upon the opening θ1 of the throttle valve 64 detected by the throttle valve opening sensor 74 is lower than a predetermined threshold value (throttle opening threshold value TH_θ1). If the opening θ1 is lower than the throttle opening threshold value TH_θ1 then the ECU 56 decides that the engine 12 is in an idling state, but if the opening θ1 is equal to or higher than the throttle opening threshold value TH_θ1, then the ECU 56 decides that the engine 12 is not in an idling state. For the throttle opening threshold value TH_θ1, for example, a minimum value θ1min of the opening θ1 (opening θ1 when the throttle valve 64 is in a fully closed state) or a value obtained by adding a predetermined margin (positive value α) to the minimum value (θ1min+α) can be used.

If it is decided at step S4 that the engine 12 is in an idling state (S4: Yes), then the ECU 56 uses, at step S5, the target NE-FR control to vary the opening θ2 of the IACV 68 to adjust the flow rate FRs of air to flow through the bypass flow passage 70. Details of the target NE-FB control are hereinafter described. If the engine 12 is not in an idling state at step S4 (S4: No), then the processing advances to step S7 hereinafter described.

If the actual engine speed NE is equal to or higher than the control changeover engine speed NEsw at step S3 (S3: No), then the ECU 56 confirms at step S6 whether or not the target NE-FB control is continuing. If the target NE-FB control is continuing (S6: Yes), then the processing advances to step S4. If the target NE-FB control is not continuing (S6: No), the processing advances to step S7.

Figure 5:
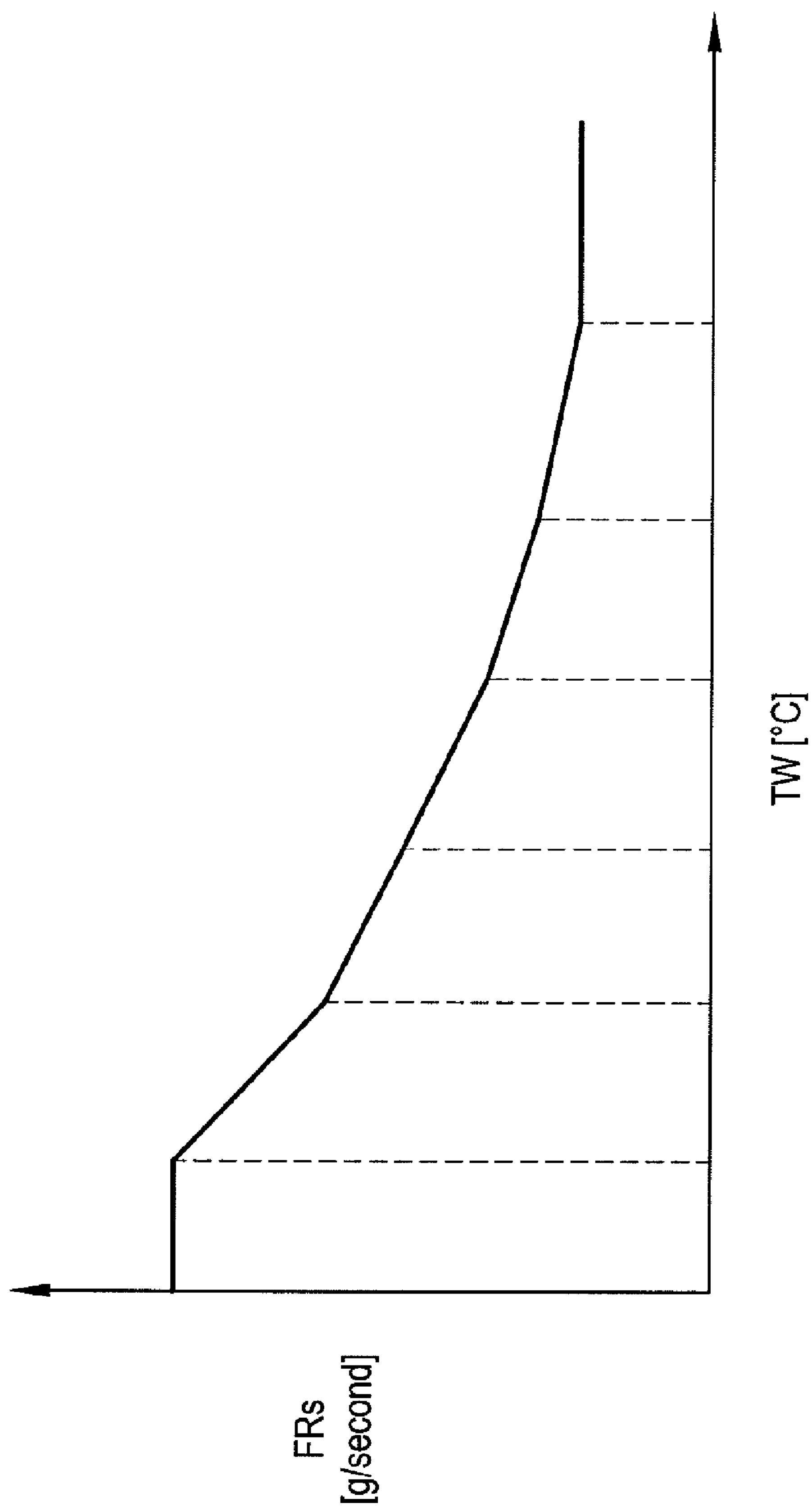
FIG. 5 is a view illustrating a relationship between the water temperature of engine cooling water and the flow rate of air flowing through a bypass flow passage used in the water temperature dependent control in the embodiment described above.

At step S7, the ECU 56 uses the water temperature dependent control to vary the opening θ2 of the IACV 68 in response to the water temperature TW to adjust the flow rate FRs of air to flow through the bypass flow passage 70 (refer to FIG. 5).

Figure 8:
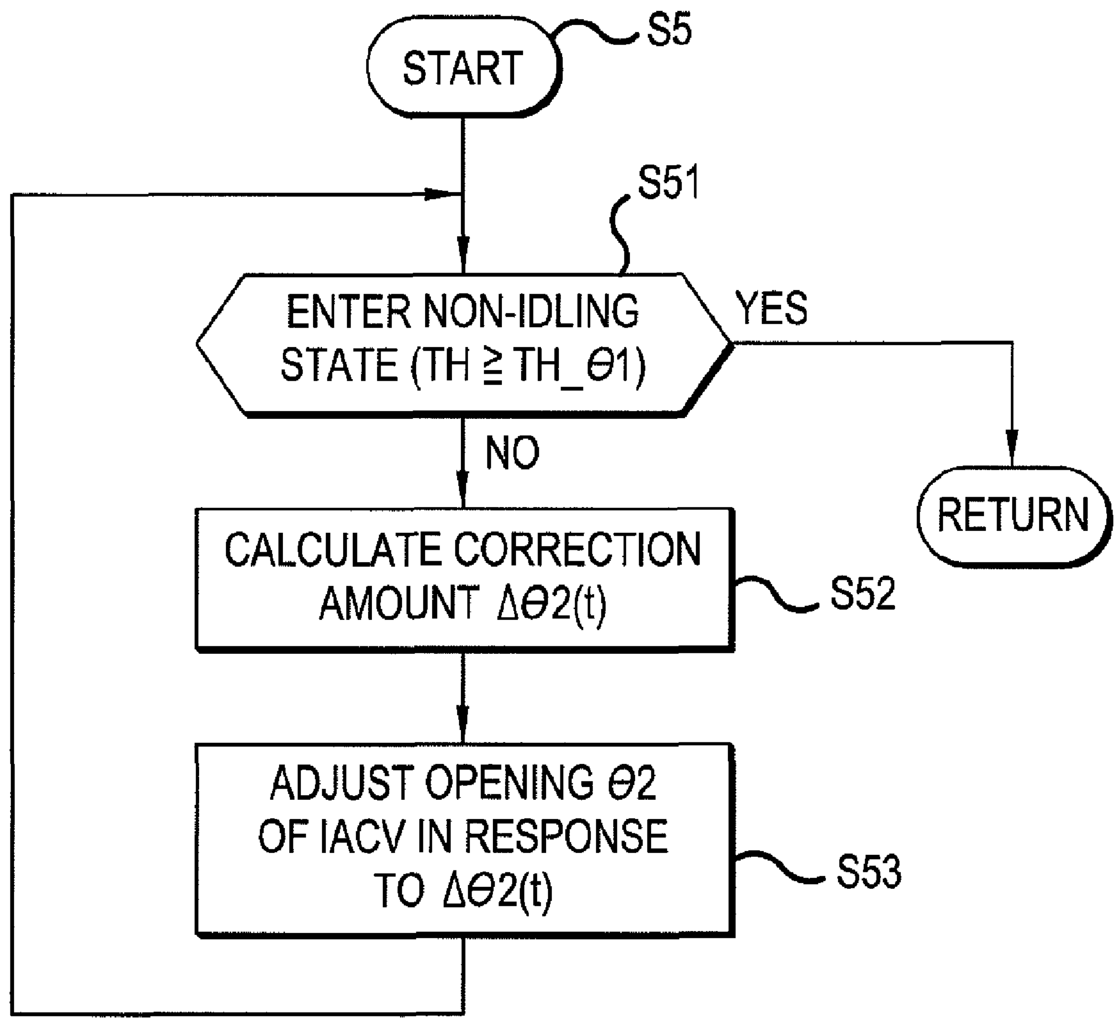
FIG. 8 is a flow chart illustrating details of the target engine speed feedback control of FIG. 4.

In FIG. 8, a subroutine of the target NE-FB control (step S5 of FIG. 4) is illustrated. At step S51, the ECU 56 decides whether or not the state of the engine 12 changes from the idling state to the non-idling state. In other words, the ECU 56 decides whether or not the opening θ1 of the throttle valve 64 is equal to or higher than the throttle opening threshold value TH_θ1. If the opening θ1 is equal to or higher than the throttle opening threshold value TH_θ1 (S51: Yes), then the target NE-FB control is ended. If the opening θ1 is lower than the throttle opening threshold value TH_θ1 (S51: No), then the processing advances to step S52.

At step S52, the ECU 56 calculates an IACV opening difference Δx(t) (=θ2−T_θ2) which is a difference between the actual opening θ2 of the IACV 68 and a target value for the opening θ2 (IACV target opening T_θ2) at a predetermined period. Then, the ECU 56 calculates the correction amount Δθ2(*t*) for the opening θ2 of the IACV 68 (amount which varies the opening θ2 of the IACV 68). The correction amount Δθ2(*t*) is calculated, for example, using PID control (proportional-integral-derivative control). In particular, the correction amount Aθ2(*t*) is calculated using the following expression (1):

[Expression 1]

$$\Delta\theta 2(t) = Kp\Delta x(t) + Ki\int_0^t \Delta x(\tau)\,d\tau + Kd\frac{d\Delta x(t)}{dt} \qquad (1)$$

In the expression (1) above, the first term on the right side is a term (P term) of the proportional control (P control); the second term is a term (I term) of the integral control (I control); and the right side third term is a term (D term) of the derivative control (D control). In the present embodiment, from among the coefficients of the terms on the right side, the coefficients Kp and Kd are variables, and the coefficient Ki is a fixed value.

At step S53, the opening θ2 of the IACV 68 is adjusted in response to the correction amount Δθ2(*t*) calculated at step S52. In particular, where the correction amount Δθ2(*t*) determined by the expression (1) given above is zero (Δx(t)=0), the ECU 56 maintains the present position of the IACV 68 to keep the flow rate (flow rate FRs) of air at present flowing through the bypass flow passage 70. Where the correction amount Δθ2(*t*) is higher than zero (correction amount Δθ2(*t*)=0), the ECU 56 opens the IACV 68 by a predetermined amount from the present position to increase the flow rate FRs. Where the correction amount Δθ2(*t*) is lower than zero (correction amount Δθ2(*t*)<0), the ECU 56 closes the IACV 68 by a predetermined amount from the present position to decrease the flow rate FRs.

The processing returns from step S53 to step S51.

Figure 9A:
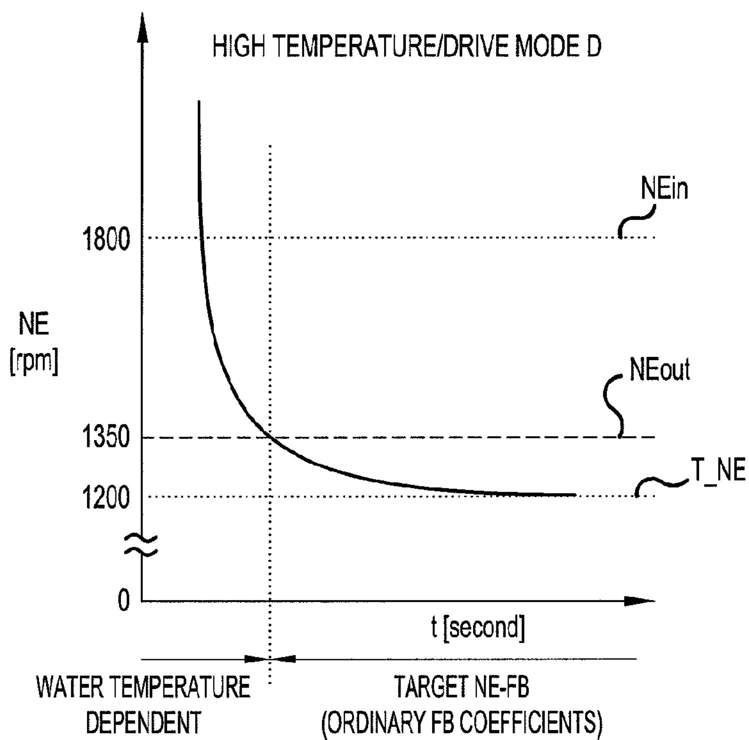
FIG. 9A is a view illustrating an example of the engine speed when the engine cooling water has a high temperature and the drive mode is selected.
Figure 9B:
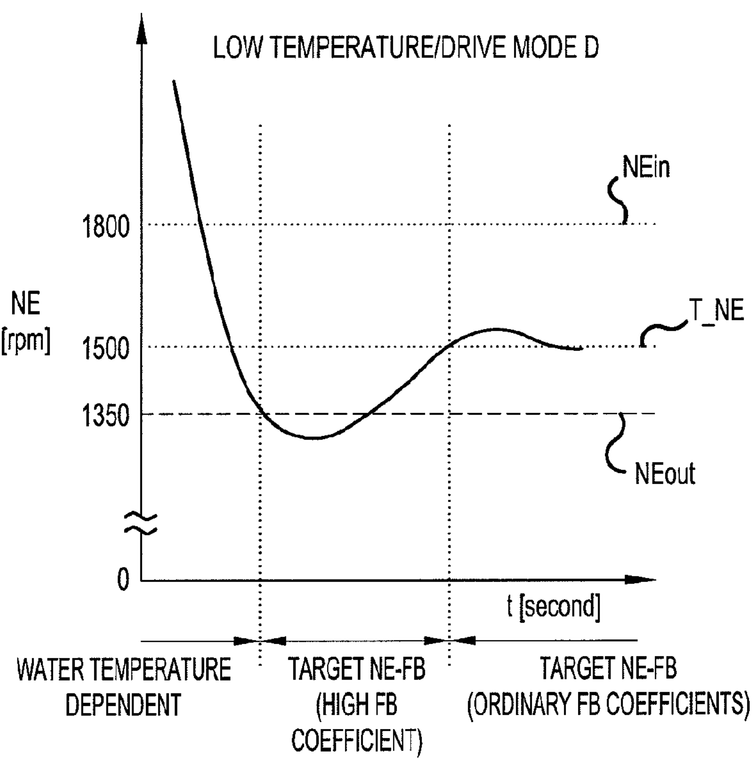
FIG. 9B is a view illustrating control of the engine speed when the engine cooling water has a low temperature and the drive mode is selected.

In the present embodiment, when the water temperature TW of the engine cooling water is the high temperature and the drive mode D is selected as shown in FIG. 9A, only an ordinary feedback coefficient is used in the target NE-FB control. On the other hand, when the water temperature TW of the engine cooling water is the low temperature and the drive mode D is selected as shown in FIG. 9B, after the target NE-FB control is started, a feedback coefficient (gain) (first feedback coefficient) higher than the ordinary feedback coefficient (gain) (second feedback coefficient) is used until the actual engine speed NE reaches the target engine speed T_NE first. Then, after the actual engine speed NE reaches the target engine speed T_NE first, the ordinary feedback control can be used.

Figure 10:
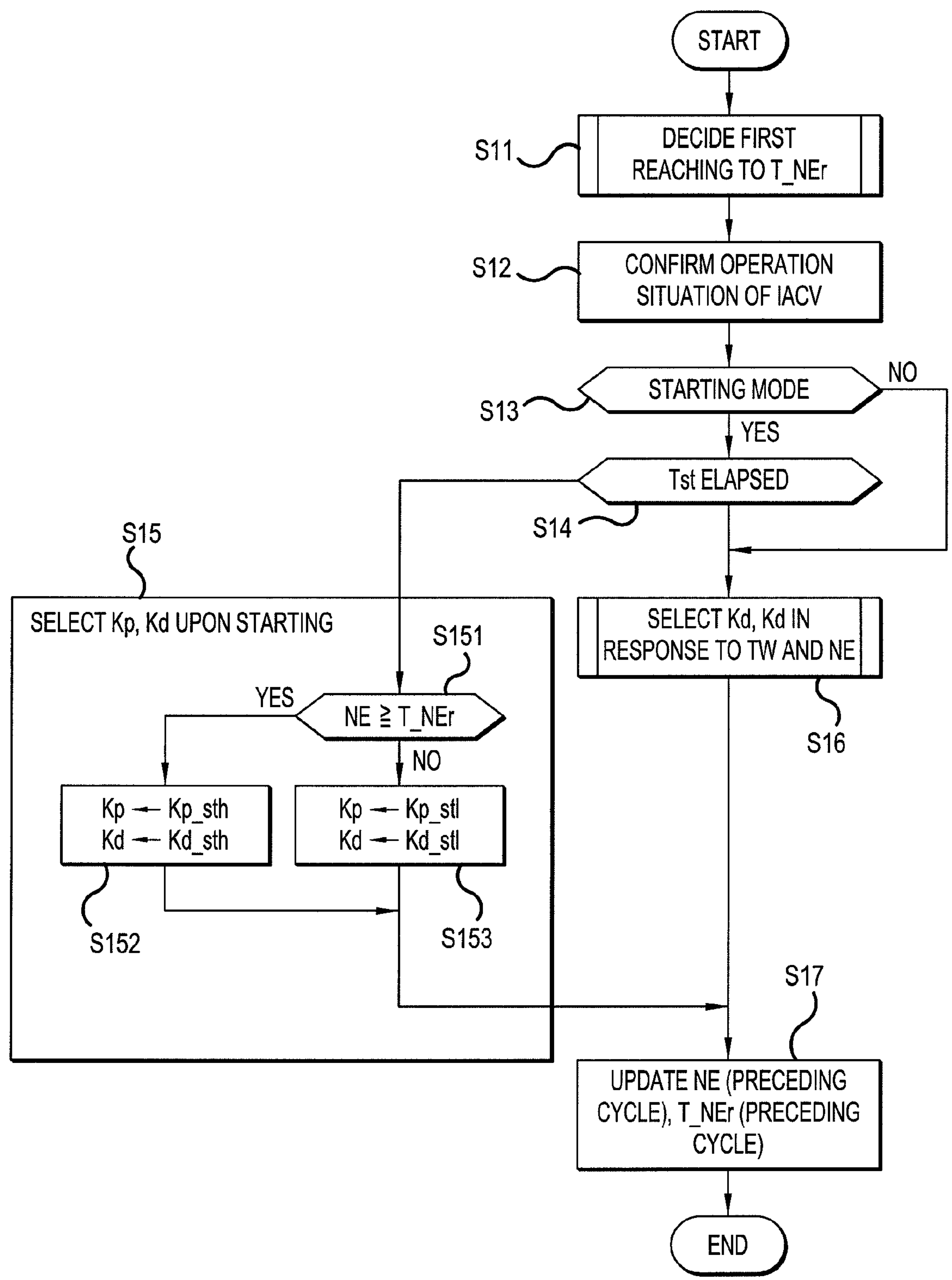
FIG. 10 is a flow chart illustrating a selection method of feedback coefficients in proportional control and differential control used in the target engine speed feedback control of FIG. 4.

In FIG. 10, a flow chart of a process of selecting the coefficients Kp and Kd to be used in the PID control for calculating the correction amount Δθ2(*t*) is shown. This process is executed by the ECU 56.

At step S11, the ECU 56 decides whether or not the actual engine speed NE has reached a reference target engine speed T_NEr [rpm] after the control changed over from the water temperature dependent control to the target NE-FB control (whether or not first reaching has been found). The reference target engine speed T_NEr is a value used as a reference value for the target engine speed T_NE when the flow chart of FIG. 10 is executed once, and at the steps of FIG. 10, comparison in numerical value (decision of branching) is carried out using the reference target engine speed T_NEr or a value obtained by adding or subtracting another value to or from the reference target engine speed T_NEr. Details of the decision of whether or not first reaching of the reference target engine speed T_NEr has been found are hereinafter described.

At step S12, the ECU 56 confirms an operation situation of the IACV 68. In particular, the ECU 56 confirms a direction of movement of the IACV 68 and presence or absence of a load from the rear wheel 54. The direction of movement of the IACV 68 signifies whether the direction of the continuously variable transmission 14 toward a target transmission ratio T_R is directed to the TOP side or the LOW side, and this movement direction is decided at step S11 (details are hereinafter described). Further, as presence or absence of a load from the rear wheel 54, it is decided which one of the neutral mode N and the drive mode D is selected using the ND signal Snd from the mode changeover mechanism 52.

At step S13, the ECU 56 decides whether or not the ECU 56 itself is in a starting mode. The starting mode is a mode used after an ignition switch not shown is switched on until the engine 12 enters a predetermined state, and warming up of the engine 12 and so forth are carried out in a concentrated manner. If the ECU 56 is in the starting mode (S13: Yes), then the ECU 56 decides at step S14 whether or not a predetermined time period Tst [second] elapses after the engine 12 is started. If the predetermined time period Tst does not elapse, then the processing advances to step S15.

At step S15, the ECU 56 selects the coefficients Kp and Kd in response to the actual engine speed NE. More particularly, at step S151, the ECU 56 decides whether or not the actual engine speed NE is equal to or higher than the reference target engine speed T_NEr. If the actual engine speed NE is equal to or higher than the reference target engine speed T_NEr (8151: Yes), then at step S152, the ECU 56 sets a fixed value Kp_sth as the coefficient Kp and sets a fixed value Kd_sth as the coefficient Kd. If the actual engine speed NE is lower than the reference target engine speed T_NEr (S151: No), then the ECU 56 sets, at step S153, a fixed value Kp_stl as the coefficient Kp and a fixed value Kd_stl as the coefficient Kd.

The fixed values Kp_stl and Kd_stl are set to values higher than Kp_sth and Kd_sth, respectively. In particular, it can be considered that, when the actual engine speed NE is lower than the reference target engine speed T_NEr, a tendency that the degree by which the errors of them are corrected by one time of processing becomes high appears and the correction speed of the errors becomes high. Consequently, the actual engine speed NE is less likely to become lower than the reference target engine speed T_NEr, and as a result, it becomes easy to prevent the actual engine speed NE from dropping to an engine speed (stall engine speed NEes) [rpm] at which the engine 12 stalls.

If the ECU 56 is not in the starting mode at step S13 (S13: No), or if the predetermined time period Tst elapses at step S14 (S14: yes), then the processing advances to step S16.

At step S16, the ECU 56 selects the coefficients Kp and Kd in response to the water temperature TW of the engine cooling water and the actual engine speed NE. Details of this selection are described later.

At step S17 after steps S15 and S16, the ECU 56 updates the preceding cycle engine speed NE (preceding cycle) indicative of the engine speed NE used in the process in the preceding cycle and the preceding cycle reference target engine speed T_NEr (preceding cycle) indicative of the reference target engine speed T_NEr used in the process in the preceding cycle. In particular, the ECU 56 stores the actual engine speed NE used in the process in the present cycle as the preceding cycle engine speed NE (preceding cycle) into the memory not shown), and stores the reference target engine speed T_NEr used in the process in the present cycle as the preceding cycle reference target engine speed T_NEr (preceding cycle).

Figure 11:
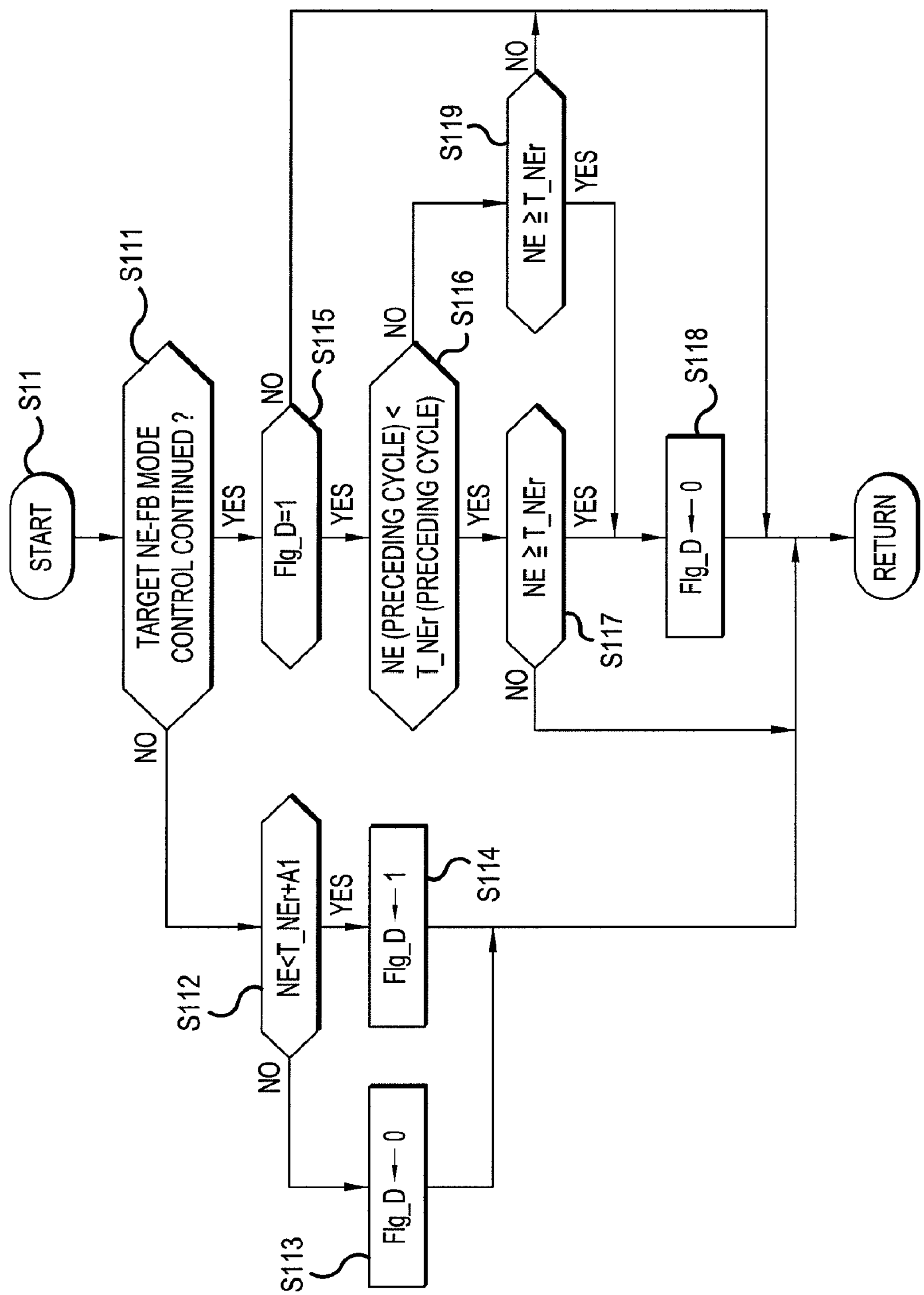
FIG. 11 is a flow chart illustrating details of a decision of first reaching to a target engine speed in FIG. 10.

In FIG. 11, the subroutine at step S11 of FIG. 10, that is, a flow chart of deciding whether or not first reaching of the actual engine speed NE to the reference target engine speed T_NEr is found after the control is changed over from the water temperature dependent control to the automatic NE-FB control, is shown.

At step S111, the ECU 56 decides whether or not the target NE-FB control is continuing (whether or not the process of the target NE-FB control in the present cycle is a process carried out first after the control changes over from the water temperature dependent control to the target NE-FB control). If the target NE-FB control is not continuing (S111: No), then the processing advances to step S112.

At step S112, the ECU 56 decides whether or not the actual engine speed NE is lower than the sum of the reference target engine speed T_NEr and a variable A1 [rpm]. The variable A1 is for adjusting, for example, at which engine speed NE the movement direction (TOP side/LOW side) of the IACV 68 should be reversed. If the actual engine speed NE is equal to or higher than the sum of the reference target engine speed T_NEr and the variable A1 (S112: No), then the ECU 56 sets a movement direction flag Flg_D to “0” at step S113. If the actual engine speed NE is lower than the sum of the reference target engine speed T_NEr and the variable A1 (S112: Yes), then the ECU 56 sets the movement direction flag Flg_D to “1” at step S114. The movement direction flag Flg_D indicates toward which one of the TOP side and the LOW side the IACV 68 should be moved, and represents, when it is “0,” that the IACV 68 should be moved toward the TOP side in order to lower the engine speed NE, but represents when it is “1” that the ACV 68 should be moved to the LOW side in order to raise the engine speed NE.

Returning to step S111, if the target NE-FB control is continuing (S111: Yes), then the ECU 56 confirms at step S115 whether or not the movement direction flag Flg_D is “1.” If the movement direction flag Flg_D is “0” (S115: No), then the ECU 56 ends the processing in the present cycle while the movement direction flag Flg_D is kept at “0.” If the movement direction flag Flg_D is “1” (S115: Yes), then the processing advances to step S116.

At step S116, the ECU 56 decides whether or not the preceding cycle engine speed NE (preceding cycle) is lower than the preceding cycle reference target engine speed T_NEr (preceding cycle). The preceding cycle engine speed NE (preceding cycle) and the preceding cycle reference target engine speed T_NEr (preceding cycle) were updated at step S17 (FIG. 10) in the processing in the preceding cycle. If the preceding cycle engine speed (preceding cycle) is lower than the preceding cycle reference target engine speed T_NEr (preceding cycle) (8116: Yes), then the processing advances to step S117.

At step S117, the ECU 56 decides the engine speed NE in the present cycle is equal to or higher than the reference target engine speed T_NEr in the present cycle. If the engine speed NE in the present cycle is lower than the reference target engine speed T_NEr in the present cycle (S117: No), then the ECU 56 ends the processing in the present cycle while the movement direction flag Flg_D is kept at “1.” If the engine speed NE in the present cycle is equal to or higher than the reference target engine speed T_NEr in the present cycle (S117: Yes), then the ECU 56 changes the movement direction flag Flg_D from “1” to “0” at step S118.

If the preceding cycle engine speed NE (preceding cycle) is equal to or higher than the preceding cycle reference target engine speed T_NEr (preceding cycle) at step S116 (S116: No), then the ECU 56 decides at step S119 whether or not the actual engine speed NE is lower than the reference target engine speed T_NEr. If the actual engine speed NE is lower than the reference target engine speed T_NEr (S119: Yes), then the ECU 56 changes the movement direction flag Flg_D from “1” to “0” at step S118. If the actual engine speed NE is equal to or higher than the reference target engine speed T_NEr (S119: No), then the ECU 56 ends the processing in the present cycle while the movement direction flag Flg_D is kept at “1.”

As described above, although the movement direction flag Flg_D may vary from “1” to “0” during the target NE-FB control, it does not change from “0” to “1” at all. Accordingly, after the movement direction flag Flg_D is set once to “0” the value “0” is maintained and the engine speed NE is lowered, and consequently, the movement direction flag Flg_D continues to indicate that the movement direction of the IACV 68 is set to the TOP side (in other words, that the engine speed NE has reached the reference target engine speed T_NEr).

Figure 12:
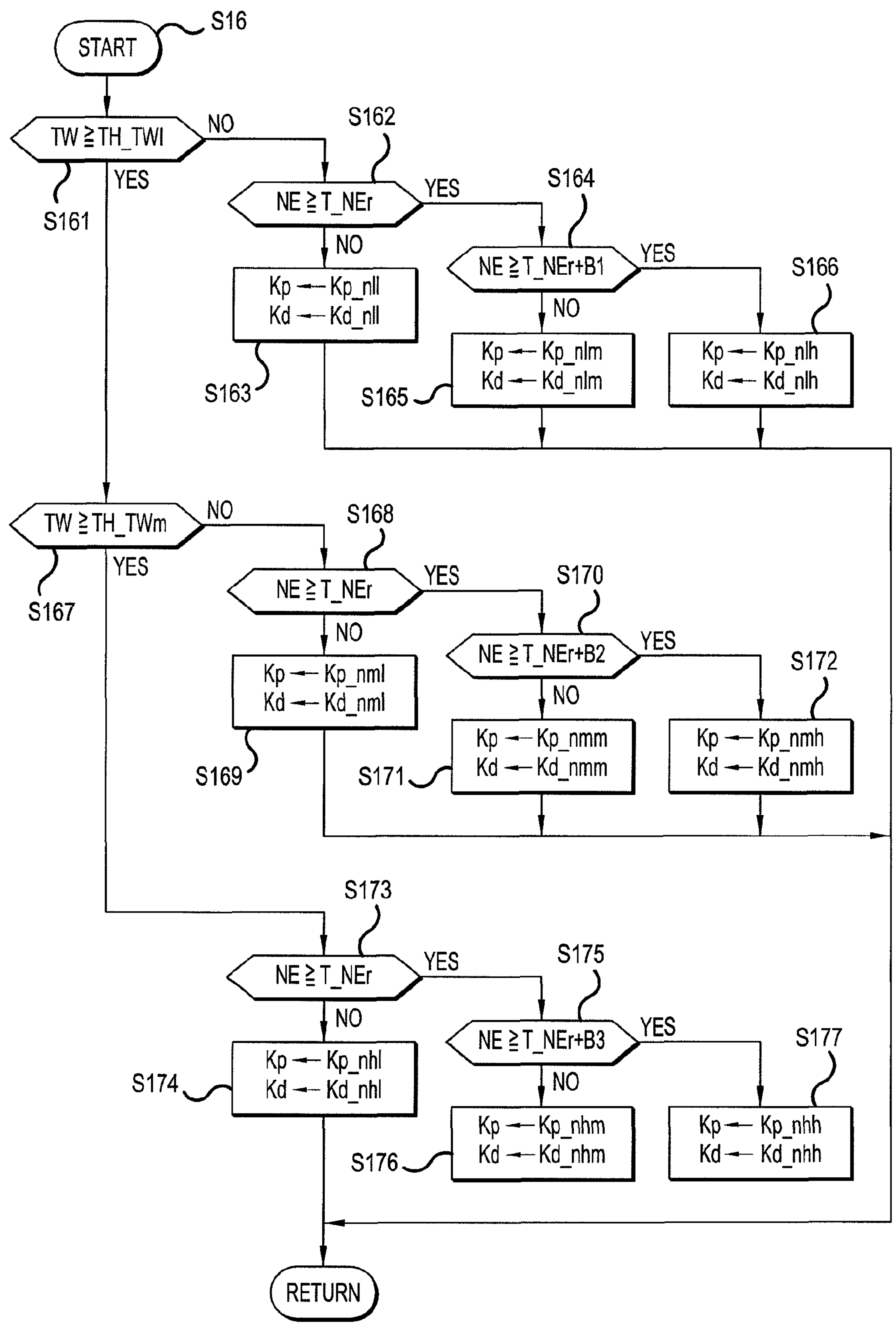
FIG. 12 is a flow chart illustrating details of a method of selecting the feedback coefficients in response to the water temperature of the engine cooling water and the engine speed in FIG. 10.

In FIG. 12, the subroutine at step S16 of FIG. 10, that is, a flow chart of selecting the coefficients Kp and Kd in response to the water temperature TW of the engine cooling water and the actual engine speed NE, is shown. In the flow chart of FIG. 12, steps S161 and S167 are used to decide to which one of a low temperature, a middle temperature and a high temperature the water temperature TW of the engine cooling water belongs. In particular, at step S161 it is decided whether or not the water temperature TW is equal to or higher than a low temperature decision threshold value TH_TW1 [° C.]. If the water temperature TW is lower than the low temperature decision threshold value TH_TW1 (S161: No), then it is decided that the water temperature TW belongs to the low temperature. If the water temperature TW is equal to or higher than the low temperature decision threshold value TH_TW1 (S161: Yes), then it is decided that the water temperature TW belongs to the middle or high temperature. At step S167, it is decided whether or not the water temperature TW is equal to or higher than a middle temperature decision threshold value TH_TWm [° C.]. If the water temperature TW is lower than the middle temperature decision threshold value TH_TWm (S167: No), then it is decided that the water temperature TW belongs to the middle temperature. If the water temperature TW is equal to or higher than the middle temperature decision threshold value TH_TWm (S167: Yes), then it is decided that the water temperature TW belongs to the high temperature.

At steps S162 to S166 following the step S161 and at steps S168 to S172 and S173 to S176 following the step S167, it is decided to which one of a low speed region, a middle speed region and a high speed region the engine speed NE belongs in each division (low temperature, middle temperature or high temperature) of the water temperature TW.

For example, in regard to the steps S162 to S166 which are used where it is decided at step S161 that the water temperature TW belongs to the low temperature, the ECU 56 decides at step S162 whether or not the actual engine speed NE is equal to or higher than the reference target engine speed T_NEr {to which one of the low speed region and the other speed regions (middle speed region and high speed region) the engine speed NE belongs}. If the actual engine speed NE is lower than the reference target engine speed T_NEr at step S162 (S162: No), then the ECU 56 decides that the actual engine speed NE belongs to the low speed region and sets fixed values Kp_nll and Kd_nll, which are to be used when the water temperature TW belongs to the low temperature and the engine speed NE belongs to the low speed region, as the coefficients Kp and Kd.

If the actual engine speed NE is equal to or higher than the reference target engine speed T_NEr (S162: Yes), then it is decided at step S164 whether or not the actual engine speed NE is equal to or higher than the sum of the reference target engine speed T_NEr and a fixed value B1 (to which one of the middle speed region and the high speed region the actual engine speed NE belongs). Details of the fixed value B1 are hereinafter described. If the actual engine speed NE is lower than the sum of the reference target engine speed T_NEr and the fixed value B1 (S164: No), then it is decided that the actual engine speed NE belongs to the middle region, and fixed values Kp_nlm and Kd_nlm which are used when the water temperature TW belongs to the low temperature and the actual engine speed NE belongs to the middle speed region are set as the coefficients Kp and Kd, respectively. If the actual engine speed NE is equal to or higher than the sum of the reference target engine speed T_NEr and the fixed value B1 at step S164 (S164: Yes), then it is decided that the actual engine speed NE belongs to the high speed region, and fixed values Kp_nlh and Kd_nlh which are used when the water temperature TW belongs to the low temperature and the actual engine speed NE belongs to the high speed region are set as the coefficients Kp and Kd, respectively.

Also the steps S168 to S172 which are used when it is decided at step S167 that the water temperature TW belongs to the middle temperature are similar to those described above. In particular, where the water temperature TW belongs to the middle temperature (S167: No) and the actual engine speed NE belongs to the low speed region (S168: No), fixed values Kp_nml and Kd_nml are set as the coefficients Kp and Kd at step S169, respectively. If the water temperature TW belongs to the middle temperature (S167: No) and the actual engine speed NE belongs to the middle speed region (S168: Yes, S170: No), then fixed values Kp_nmm and Kd_nmm are set as the coefficients Kp and Kd at step S171, respectively. If the water temperature TW belongs to the middle temperature (step S167: No) and the actual engine speed NE belongs to the high speed region (step S168: Yes, S170: Yes), then fixed values Kp_nmh and Kd_nmh are set as the coefficients Kp and Kd at step S172, respectively.

Also the steps S173 to S177 which are used when it is decided at step S167 that the water temperature TW belongs to the high temperature are similar to those described above. In particular, where the water temperature TW belongs to the high temperature (S167: Yes) and the actual engine speed NE belongs to the low speed region (S173: No), fixed values Kp_nhl and Kd_nhl are set as the coefficients Kp and Kd at step S174, respectively. If the water temperature TW belongs to the high temperature (S167: Yes) and the actual engine speed NE belongs to the middle speed region (S173: Yes, S175: No), then fixed values Kp_nhm and Kd_nhm are set as the coefficients Kp and Kd at step S176, respectively. If the water temperature TW belongs to the high temperature (step S167: Yes) and the actual engine speed NE belongs to the high speed region (step S173: Yes, S175: Yes), then fixed values Kp_nhh and Kd_nhh are set as the coefficients Kp and Kd at step S177.

It is to be noted that the fixed value B1 used at step S164, a fixed value B2 used at step S170 and a fixed value B3 used at step S175 need not necessarily be the same value but may be changed suitably. For example, they may be set to B1>B2>B3.

Further, regarding the fixed values used for the coefficients Kp and Kd, even where the actual engine speed NE belongs to the same speed region (low speed region, middle speed region or high speed region), the fixed values when the water temperature TW is comparatively low are set to high values, but the fixed values when the water temperature TW is comparatively high are set to low values. For example, even where the fixed values Kp_nll, Kp_nml and Kp_nhm belong to the same low speed region, the fixed value Kp_nll where the water temperature TW belongs to the low temperature is set to the highest value; the fixed value Kp_nml where the water temperature TW belongs to the middle temperature is set to the second highest value; and the fixed value Kp_nhl where the water temperature TW belongs to the high temperature is set to the lowest value (Kp_nll>Kp_nml>Kp_nhl).

Further, regarding the fixed values used for the coefficients Kp and Kd, even where the water temperature TW belongs to the same range (low temperature, middle temperature or high temperature), the fixed values when the actual engine speed NE is comparatively low are set to high values, but the fixed values when the actual engine speed NE is comparatively high are set to low values. For example, even regarding the fixed values Kp_nll, Kp_nlm and Kp_nlh where the water temperature TW belong to the low temperature, the fixed value Kp_nll where the engine speed NE belongs to the low speed region is set to the highest value; the fixed value Kp_nml where the engine speed NE belongs to the middle speed region is set to the second highest value; and the fixed value Kp_nhl where the engine speed NE belongs to the high speed region is set to the lowest value (Kp_nll>Kp_nlm>Kp_nlh).

By setting the fixed values in accordance with such rules as described above, it becomes easy to prevent engine stall in an environment wherein the engine stall of the engine 12 is liable to occur (the water temperature TW belongs to the low temperature and the engine speed NE belongs to the low speed region).

In the embodiment described above, when the actual engine speed NE drops to the clutch disengagement engine speed NEout, it is possible to change over the control from the water temperature dependent control (open loop control) of controlling the flow rate FRs of the bypass flow passage 70 in response to the water temperature TW of the engine cooling water to the target NF-FB control of controlling the flow rate FRs in response to the difference between the actual engine speed NE and the target engine speed T_NE. In the centrifugal clutch 10 which is automatically engaged and disengaged in response to the engine speed NE, the clutch engagement engine speed NEin exhibits a value higher than that of the clutch disengagement engine speed NEout. Therefore, even if the actual engine speed NE exceeds the clutch disengagement engine speed NEout a little immediately after the actual engine speed NE drops to the clutch disengagement engine speed NEout, since the centrifugal clutch 10 remains in the disengaging state, the load which is applied to the engine 12 when the centrifugal clutch 10 remains in the engaged state can be eliminated while the target NE-FB feedback control which exhibits an effect upon idling can be used efficiently.

Further, it is made possible to select the drive mode D and the neutral mode N such that, when the drive mode D is selected, the control changeover engine speed NEsw is set to a value equal to that of the clutch disengagement engine speed NEout, but when the neutral mode N is selected, the control changeover engine speed NEsw is set to a value higher than that of the clutch disengagement engine speed NEout. When the drive mode D is selected, there is the possibility to some degree that the vehicle is re-accelerated, but when the neutral mode N is selected, the possibility of re-acceleration is very low. Therefore, for example, where warming up of the engine 12 is not sufficient, changeover from the water temperature dependent control to the target NE-FB control can be carried out more rapidly.

As described hereinabove with reference to FIGS. 9B and 12, after the target NE-FB control is started, before the actual engine speed NE first reaches the target engine speed T_NE, feedback coefficients (gains) Kp and Kd higher than the normal feedback coefficients (gains) Kp and Kd are used, but after the actual engine speed NE first reaches the target engine speed T_NE, the normal coefficients Kp and Kd are used.

Consequently, for example, the possibility that the engine stall of the engine 12 may occur can be lowered. In particular, where warming up of the engine 12 is not sufficient and the vehicle which incorporates the power unit 50 runs at a low speed and then the throttle valve 64 is opened while the centrifugal clutch 10 is in a half-engaged state, torque from the engine 12 is not sufficiently transmitted to the rear wheel 54 (driving wheel), but the increasing rate of the vehicle speed v becomes lower than the increasing rate of the engine speed NE (the vehicle speed v does not increase as much as the engine speed NE). On the other hand, if the control changes over from the target NE-FB control to the water temperature dependent control because the throttle valve 64 is opened, then the IACV 68 is generally configured such that the opening θ2 thereof decreases and the flow rate FRs of air flowing through the bypass flow passage 70 decreases. If, in this state, the throttle valve 64 is closed immediately, then since the engine 12 is not acted upon by reverse driving force from the rear wheel 54 (driving force transmitted from the rear wheel 54 to the engine 12 by rotation of the rear wheel 54), the actual engine speed NE drops quickly to the clutch disengagement engine speed NEout at which the centrifugal clutch 10 is disengaged and rapidly drops further to the stall engine speed NEes, and there is the possibility that the engine stall may occur because the rise of the engine speed NE by the target NE-FB control is not sufficiently effective. Here, according to the present embodiment, after the actual engine speed NE drops to the clutch disengagement engine speed NEout and the target NE-FB control is started, before the actual engine speed NE first reaches the target engine speed T_NE, the coefficients Kp and Kd higher than the ordinary coefficients Kp and Kd are used. Therefore, it is possible to prevent the actual engine speed NE from dropping from the clutch disengagement engine speed NEout to the stall engine speed NEes as described above thereby to make the engine stall occur less likely.

In the embodiment described above, the control changeover engine speed NEsw in the neutral mode N is carried in response to the water temperature TW. Consequently, the control can be changed over from the water temperature dependent control to the target NE-FB control mechanically in response to the warming up state of the engine 12. For example, immediately after the engine 12 is started when rapid warming up is demanded, by setting the control changeover engine speed NEsw to a high value, the target NE-FB control can be entered rapidly to carry out warming up rapidly.

In the embodiment described above, when the drive mode D is selected, in the target NE-FB control, the target engine speed T_NE is set to a value equal to or higher than the clutch disengagement engine speed NEout but equal to or lower than the clutch engagement engine speed NEin. In the centrifugal clutch 10, the clutch engagement engine speed NEin exhibits a value higher than that of the clutch disengagement engine speed NEout. In other words, a hysteresis exists in the engagement and disengagement of the centrifugal clutch 10. After the centrifugal clutch 10 is disengaged once, the centrifugal clutch 10 is not placed into an engaged state until the actual engine speed NE reaches the clutch engagement engine speed NEin. By utilizing this fact to set the target engine speed T_NE to a value equal to or higher than the clutch disengagement engine speed NEout but equal to or lower than the clutch engagement engine speed NEin, it is possible to carry out warming up of the engine 12 using the target engine speed T_NE of a comparatively high value in a state wherein the centrifugal clutch 10 is disengaged.

It is to be noted that, while, in the embodiment described above, the continuously variable transmission 14 of the swash plate hydraulic type is used as the transmission, any other continuously variable transmission such as a belt type continuously variable transmission or any other transmission such as a gear type transmission can be used.

While, in the embodiment described above, the water temperature TW of the engine cooling water is used as an index for deciding the warming up state or the internal temperature of the engine 12, the index is not limited to this. For example, it is possible to provide a temperature sensor for detecting the internal temperature of the engine 12 and use an output from the temperature sensor to decide the warming up state or the internal temperature of the engine 12.

While, in the embodiment described above, the control changeover engine speed NEsw in the drive mode D is set equal to the clutch disengagement engine speed NEout, also it is possible to use a value obtained by adding a margin (negative value) determined taking a decision error and so forth into consideration to the clutch disengagement engine speed NEout.

In the embodiment described, as conditions for changing over the control from the water temperature dependent control to the target NE-FB control, it is necessary for the opening θ1 of the throttle valve 64 to be lower than the throttle opening threshold value TH_θ1 (step S4 of FIG. 4) in addition to the actual engine speed NE being equal to or lower than the control changeover engine speed NEsw (step S3 of FIG. 4). However, the condition regarding the opening θ1 of the throttle valve 64 need not necessarily be applied, but changeover to the target NE-FB control may be carried out only from the relationship between the actual engine speed NE and the control changeover engine speed NEsw.

While, in the embodiment described above, the opening θ2 of the IACV 68 is controlled with the correction value Δθ2(*t*), also it is possible to control the opening θ2 of the IACV 68 also by directly using the target opening θ2 of the IACV 68 or the like.

While, in the embodiment described above, the coefficient Kp of the P term and the coefficient Kd of the D term are variables and the coefficient Ki of the I term is a fixed value, which coefficient should be a variable or a fixed value can be selected suitably.

In the embodiment described above, regarding the fixed values used for the coefficients Kp and Kd, even if the actual engine speed NE belongs to the same speed region (low speed region, middle speed region or high speed region), the fixed value when the water temperature TW has a comparatively low value is set to a high value, but the fixed value when the water temperature TW is comparatively high is set to a low value. However, setting of the fixed values is not limited to this, and also it is possible to change the setting such as, for example, to set the fixed values equal even if the water temperature TW differs.

In the embodiment described above, regarding the fixed values used for the coefficients Kp and Kd, even if the water temperature TW belongs to the same range (low temperature, middle temperature or high temperature), the fixed values when the actual engine speed NE is comparatively low are set to high values, but the fixed values when the actual engine speed NE is comparatively high are set to low values. However, setting of the fixed values is not limited to this, but also it is possible to change the setting, for example, to set the fixed values equal even if the actual engine speed NE differs.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A flow controlling method for an auxiliary intake flow passage for controlling the flow rate of air flowing through an auxiliary intake flow passage in a power unit which includes an engine which communicates with a main intake flow passage in which a throttle valve is provided and said auxiliary intake flow passage in which an intake air control valve (IACV) is provided, a starter clutch for being automatically placed into engagement/disengagement in response to an engine speed, and a transmission connected to said starter clutch, comprising the following steps:

controlling said IACV with an open loop control for controlling the opening of said IACV in response to a warming up state of said engine and feedback control for controlling the opening of said IACV in response to the difference between an actual engine speed and a target engine speed are used;

wherein when the actual engine speed drops to a clutch disengagement engine speed indicative of an engine speed at which said starter clutch is disengaged, the control of said IACV is changed over from the open loop control to the feedback control, wherein a drive mode in which torque from said engine is transmitted to a driving wheel and a neutral mode in which the torque is not transmitted to said driving wheel are provided for selection such that, when the drive mode is selected, a control changeover engine speed which is an engine speed at which the control of said IACV is to be changed over from the open loop control to the feedback control is set lower than the clutch disengagement engine speed or a value obtained by adding a predetermined margin which assumes a negative value to the clutch disengagement engine speed, but when the neutral mode is selected, the control changeover engine speed is set to a value higher than the clutch changeover engine speed.

2. The flow controlling method for the auxiliary intake flow passage according to claim 1, wherein, after the feedback control is started, before the actual engine speed first reaches the target engine speed, a first feedback coefficient is used, but after the actual engine speed first reaches the target engine speed, a second feedback coefficient lower than the first feedback coefficient is used.

3. The flow controlling method for the auxiliary intake flow passage according to claim 1, wherein the control changeover engine speed in the neutral mode is varied in response to an internal temperature of said engine.

4. The flow controlling method for the auxiliary intake flow passage according to claim 1, wherein, when the drive mode is selected, in the feedback control, the target engine speed is set to a value which is higher than the clutch disengagement engine speed but is lower than a clutch engagement engine speed indicative of an engine speed at which said starter clutch is engaged.

5. The flow controlling method for the auxiliary intake flow passage according to claim 1, wherein, when the throttle opening increases to a predetermined threshold value, the control of said IACV is changed over from the feedback control to the open loop control.

6. The flow controlling method for the auxiliary intake flow passage according to claim 2, wherein, when the throttle opening increases to a predetermined threshold value, the control of said IACV is changed over from the feedback control to the open loop control.

7. The flow controlling method for the auxiliary intake flow passage according to claim 3, wherein, when the throttle opening increases to a predetermined threshold value, the control of said IACV is changed over from the feedback control to the open loop control.

8. The flow controlling method for the auxiliary intake flow passage according to claim 4, wherein, when the throttle opening increases to a predetermined threshold value, the control of said IACV is changed over from the feedback control to the open loop control.

9. A flow controlling method for an auxiliary intake flow passage for controlling the flow rate of air flowing through an auxiliary intake flow passage in a power unit which includes an engine which communicates with a main intake flow passage in which a throttle valve is provided and said auxiliary intake flow passage in which an intake air control valve (IACV) is provided, a starter clutch for being automatically placed into engagement/disengagement in response to an engine speed, and a transmission connected to said starter clutch, comprising the following steps:

controlling said IACV with an open loop control for controlling the opening of said IACV in response to a warming up state of said engine;

providing a feedback control for controlling the opening of said IACV in response to the difference between an actual engine speed and a target engine speed are used; and changing the control of the IACV from the open loop control to the feedback control when the actual engine speed drops to a clutch disengagement engine speed indicative of an engine speed at which said starter clutch is disengaged, wherein, when the throttle opening increases to a predetermined threshold value, the control of said IACV is changed over from the feedback control to the open loop control.

10. The flow controlling method for the auxiliary intake flow passage according to claim 9, wherein a drive mode in which torque from said engine is transmitted to a driving wheel and a neutral mode in which the torque is not transmitted to said driving wheel are provided for selection such that, when the drive mode is selected, a control changeover engine speed which is an engine speed at which the control of said IACV is to be changed over from the open loop control to the feedback control is set lower than the clutch disengagement engine speed or a value obtained by adding a predetermined margin which assumes a negative value to the clutch disengagement engine speed, but when the neutral mode is selected, the control changeover engine speed is set to a value higher than the clutch changeover engine speed.

11. The flow controlling method for the auxiliary intake flow passage according to claim 9, wherein, after the feedback control is started, before the actual engine speed first reaches the target engine speed, a first feedback coefficient is used, but after the actual engine speed first reaches the target engine speed, a second feedback coefficient lower than the first feedback coefficient is used.

12. The flow controlling method for the auxiliary intake flow passage according to claim 10, wherein, after the feedback control is started, before the actual engine speed first reaches the target engine speed, a first feedback coefficient is used, but after the actual engine speed first reaches the target engine speed, a second feedback coefficient lower than the first feedback coefficient is used.

13. The flow controlling method for the auxiliary intake flow passage according to claim 10, wherein the control changeover engine speed in the neutral mode is varied in response to an internal temperature of said engine.

14. The flow controlling method for the auxiliary intake flow passage according to claim 10, wherein, when the drive mode is selected, in the feedback control, the target engine speed is set to a value which is higher than the clutch disengagement engine speed but is lower than a clutch engagement engine speed indicative of an engine speed at which said starter clutch is engaged.

15. A flow controlling method for an auxiliary intake flow passage for controlling the flow rate of air flowing through an auxiliary intake flow passage in a power unit which includes an engine which communicates with a main intake flow passage in which a throttle valve is provided and said auxiliary intake flow passage in which an intake air control valve (IACV) is provided, a starter clutch for being automatically placed into engagement/disengagement in response to an engine speed, and a transmission connected to said starter clutch, comprising the following steps:

controlling said IACV with an open loop control for controlling the opening of said IACV in response to a warming up state of said engine and feedback control for controlling the opening of said IACV in response to the difference between an actual engine speed and a target engine speed are used;

wherein when the actual engine speed drops to a clutch disengagement engine speed indicative of an engine speed at which said starter clutch is disengaged, the control of said IACV is changed over from the open loop control to the feedback control, wherein, after the feedback control is started, before the actual engine speed first reaches the target engine speed, a first feedback coefficient is used, but after the actual engine speed first reaches the target engine speed, a second feedback coefficient lower than the first feedback coefficient is used.

16. The flow controlling method for the auxiliary intake flow passage according to claim 15, wherein a drive mode in which torque from said engine is transmitted to a driving wheel and a neutral mode in which the torque is not transmitted to said driving wheel are provided for selection such that, when the drive mode is selected, a control changeover engine speed which is an engine speed at which the control of said IACV is to be changed over from the open loop control to the feedback control is set lower than the clutch disengagement engine speed or a value obtained by adding a predetermined margin which assumes a negative value to the clutch disengagement engine speed, but when the neutral mode is selected, the control changeover engine speed is set to a value higher than the clutch changeover engine speed.

17. The flow controlling method for the auxiliary intake flow passage according to claim 15, wherein, when the throttle opening increases to a predetermined threshold value, the control of said IACV is changed over from the feedback control to the open loop control.

* * * * *